United States Patent [19]
Bennett et al.

[11] Patent Number: 5,337,606
[45] Date of Patent: Aug. 16, 1994

[54] LATERALLY SENSITIVE ACCELEROMETER AND METHOD FOR MAKING

[75] Inventors: Paul T. Bennett, Phoenix; Ronald J. Gutteridge, Paradise Valley; Daniel N. Koury, Jr., Tempe; David F. Mietus, Phoenix; Ljubisa Ristic, Paradise Valley, all of Ariz.

[73] Assignee: Motorola, Inc., Schaumburg, Ill.

[21] Appl. No.: 926,616

[22] Filed: Aug. 10, 1992

[51] Int. Cl.5 .................. G01P 15/08; H01G 7/00
[52] U.S. Cl. .................. 73/517 R; 29/75.41; 361/283.1
[58] Field of Search .................. 73/517 R, 718, 724; 361/283.1; 29/25.41

[56] References Cited

U.S. PATENT DOCUMENTS

| | | | |
|---|---|---|---|
| 4,091,680 | 5/1978 | Block | 73/517 R |
| 5,181,156 | 1/1993 | Gutteridge et al. | 361/283.1 |

*Primary Examiner*—Donald O. Woodiel
*Attorney, Agent, or Firm*—William E. Koch; Joe E. Barbee

[57] ABSTRACT

A micromachined capacitor structure having a first anchor (12) attached to the substrate (24), a tether (13) coupled to the anchor (12) and having a portion free to move in a lateral direction over the substrate (24) in response to acceleration. A tie-bar (14) is coupled to the movable portion of the tether (13), and at least one movable capacitor plate (16) is coupled to the tie bar (13). A first fixed capacitor plate (16) is attached to the substrate (24) laterally overlapping and vertically spaced from the at least one movable capacitor plate (16).

18 Claims, 3 Drawing Sheets

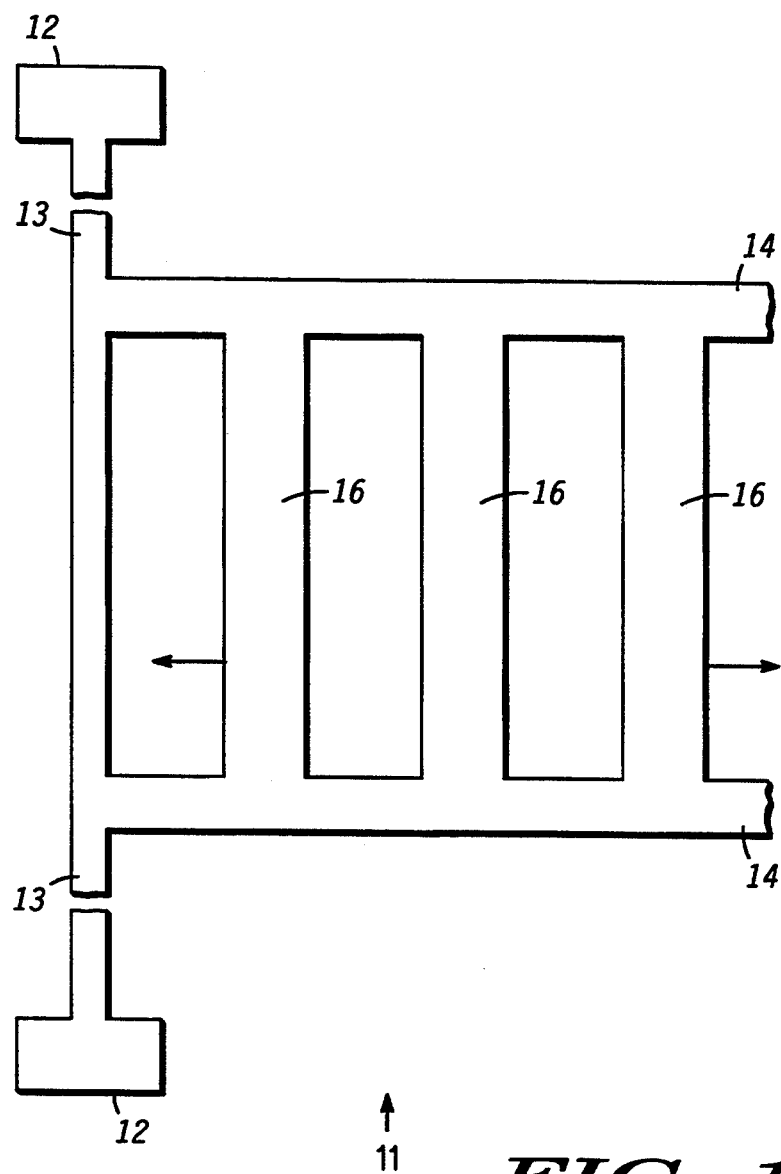
FIG. 1
FIG. 2
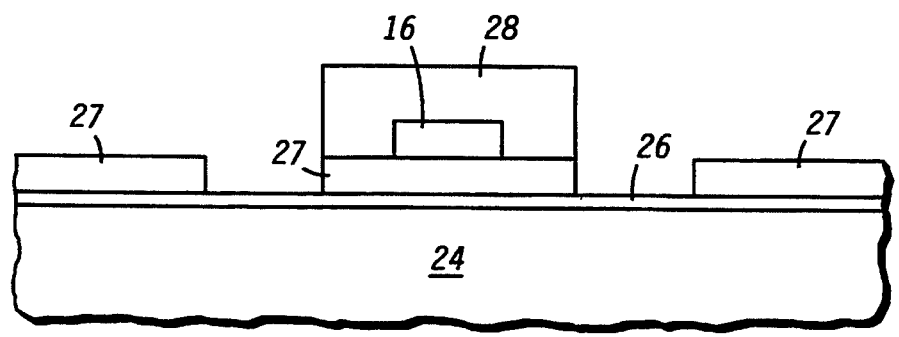

5,337,606

LATERALLY SENSITIVE ACCELEROMETER AND METHOD FOR MAKING

BACKGROUND OF THE INVENTION

The present invention relates, in general, to solid state sensors, and more particularly, to solid state sensors having a micromachined capacitor structure.

Many micromachined devices are now well known, including force, acceleration, and pressure sensors. The term "micromachined" is used because the devices employ mechanical structures and geometries which are as small as a few tenths of a micrometer. The small dimensions are achieved by photolithographic and etching techniques similar to that used in integrated circuit manufacturing. Usually, many devices are manufactured on a single substrate. Often, a silicon substrate is used.

Most often, micromachined sensors use piezoresistive properties of silicon to generate a signal. Alternatively, capacitor plates can be formed on the substrate so that at least one capacitor plate can move with respect no another capacitor plate. The relative movement in response to pressure or acceleration changes the capacitance of the structure. This change in capacitance is detected as an output signal.

Unfortunately, prior micromachined capacitor structures suffer from a number of limitations which raise the cost of manufacture, limit accuracy, and preclude their use in many applications. For example, most capacitor structures currently available are only sensitive to acceleration that occurs vertically with respect to the surface of the device. This creates difficulty in packaging and mounting the device in many applications.

Prior capacitor structures were usually designed as cantilevers with one end anchored to a substrate and another end free to swing vertically in relation to a fixed capacitor plate. Capacitance of the device varied as the spacing between the cantilevers and the substrate became smaller. Unfortunately, capacitance changes non-linearly with spacing between capacitor plates, resulting in a non-linear response characteristic for the accelerometer.

What is needed is a micromachined capacitor structure and method for making it that is sensitive to lateral acceleration and provides a linear capacitance change with acceleration.

SUMMARY OF THE INVENTION

Briefly stated, the present invention is achieved by a micromachined capacitor structure having a first anchor attached to the substrate, a tether coupled to the anchor and having a portion free to move in a lateral direction over the substrate in response to acceleration. A tie-bar is coupled to the movable portion of the tether, and at least one movable capacitor plate is coupled to the tie bar. A first fixed capacitor plate is attached to the substrate laterally overlapping and vertically spaced from the at least one movable capacitor plate.

In a method for making a laterally sensitive accelerometer in accordance with the present invention, a substrate is covered by a first sacrificial layer. The first sacrificial layer is patterned to expose portions of the substrate. A first polysilicon layer is deposited and patterned to provide a plurality of anchors, a tether coupled between two of the plurality of anchors, and a movable capacitor plate coupled to a central portion of the tether. The movable capacitor plate is covered with a second sacrificial dielectric which is patterned to expose some of the anchors. A first fixed capacitor plate having a first portion that is attached to at least two of the exposed anchors and a second portion that overhangs the movable capacitor plate and is vertically separated from the movable capacitor plate is then formed. The sacrificial layers are then etched away.

BRIEF DESCRIPTION OF THE DRAWINGS

FIG. 1 is a highly simplified top view of a portion of a laterally sensitive accelerometer in accordance with the present invention;

FIG. 2 is a cross-section view of the structure shown in FIG. 1 at an early stage of processing;

DETAILED DESCRIPTION OF THE DRAWINGS

Figure 3:
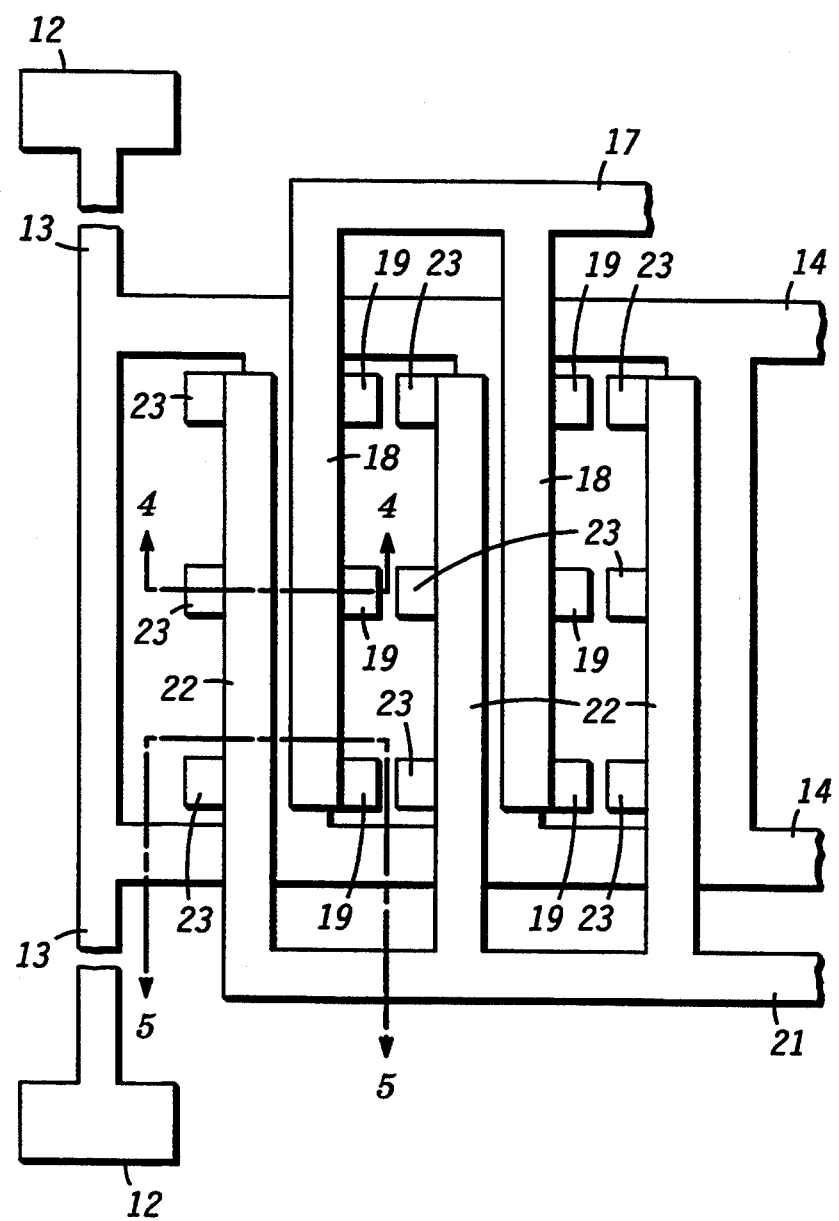
FIG. 3 is a top view of the structure in FIGS. 1-2 further along in processing.

FIG. 1 is a highly simplified top view of a portion of a laterally sensitive accelerometer in accordance with the present invention. Movable capacitor network 11 is designed to travel laterally as suggested by arrows in FIG. 1 in response to acceleration. Movable capacitor network 11 includes anchors 12 that are attached to a substrate 24 (shown in FIG. 2). Although only two anchors 12 are shown, it is generally useful to form a symmetrical structure supported by anchors 12 at four corners. Tether 13 spans between two anchors 12. Tether 13 has a central portion that is free to bend or move in a lateral direction and should be designed to be long enough to allow a desired degree of motion.

Although movable capacitor network 11 can take a variety of shapes to meet needs of a particular application, it is illustrated in FIG. 1 as a ladder-like network comprising movable capacitor plates 16 and tie bars 14 coupled to the central portion of tether 13. The number of movable capacitor plates 16 is chosen to meet particular application criteria, such as sensitivity, size constraints, and linearity. Movable capacitor plates 16 are rectangular in the preferred embodiment, having one end attached to a first tie bar 14 and another end attached to a second tie bar 14. Tie bar 14 serves to mechanically attach movable capacitor plates 16 to tether 13 and to electrically couple each of the movable capacitor plates 16 in parallel to each other.

FIG. 2 illustrates in cross-section initial process steps taken during the formation of the laterally sensitive accelerometer in accordance with the present invention. Substrate 24 is selected for mechanical support, but can include semiconductor devices and integrated circuitry when substrate 24 comprises a semiconductor material.

In a preferred embodiment, substrate 24 comprises silicon. Substrate 24 may optionally be coated with one or more dielectric layers, such as dielectric layer 26 shown in FIG. 2. In a preferred embodiment dielectric layer 26 comprises approximately 0.2 micrometers of silicon nitride deposited by low pressure chemical vapor deposition. For purposes of description of the present invention, the term "substrate" is intended to include either a homogeneous material such as a semiconductor or insulator, as well as a material coated with one or more dielectric layers and having integrated circuitry formed therein.

A first sacrificial layer 27 is formed covering substrate 24. Thickness of first sacrificial layer 27 is determined by the desired separation between substrate 24 and movable capacitor plates 16. First sacrificial layer comprises silicon oxide in a preferred embodiment. First sacrificial layer 27 is patterned to expose portions of substrate 24. These exposed portions are where anchors, such as anchors 12 in FIG. 1, will eventually be formed.

Movable capacitor network 11 is formed covering first sacrificial layer 27. In a preferred embodiment, a homogenous layer of doped polysilicon is deposited on sacrificial layer 27 as a blanket layer and patterned to form anchors 12, tether 13, tie bars 14 (all shown in FIG. 1) as well as movable capacitor plates 16. A second sacrificial layer 28 is then deposited and patterned to cover movable capacitor plates 16, and to leave some exposed portions of substrate 24. Thickness of second sacrificial layer 28 determines separation between movable capacitor plates 16 and a subsequently formed fixed capacitor plate, and so is selected to achieve the desired capacitance using well known formulas and techniques.

FIG. 3 illustrates a top view showing fixed capacitor networks 17 and 21 which overlie movable capacitor network 11 in an interdigitated fashion. Only one fixed capacitor network (either network 17 or network 21) is necessary to provide a laterally sensitive accelerometer, but significant advantage is achieved by using at least both fixed capacitor network 17 and fixed capacitor network 21, as they provide a differential signal in response to acceleration.

Fixed capacitor network 17 comprises fixed capacitor plates 18, which are intermittently attached to substrate 24 by anchors 19. Each fixed capacitor plate 18 is aligned to laterally overlap a portion of a movable capacitor plate 16. Each anchor 19 is aligned to laterally space the anchor from an edge of movable capacitor plate 16, allowing lateral motion of movable capacitor plate 16. Each fixed capacitor plate 18 is electrically coupled in parallel in a preferred embodiment.

Another fixed capacitor network 21 comprises fixed capacitor plates 22, which are intermittently attached to substrate 24 by anchors 23. Each fixed capacitor plate 22 is aligned to laterally overlap a portion of a movable capacitor plate 16 that is on an opposite side of movable capacitor plate 16 from fixed capacitor plates 18. Each anchor 23 is aligned to laterally space the anchor from an edge of movable capacitor plate 16, allowing lateral motion of movable capacitor plate 16. Each fixed capacitor plate 22 is electrically coupled in parallel in a preferred embodiment and electrically isolated from fixed capacitor plates 19 and movable capacitor plates 16.

It should be understood that fixed capacitor networks 17 and 21 can have other geometries to satisfy needs of a particular application, and the specific geometry shown in FIG. 3 is provided for purposes of illustration, not limitation. In particular, one or more of the fixed capacitor plates can be positioned below movable capacitor network 11, rather than above the movable capacitor network 11. For ease of illustration, FIG. 4 and FIG. 5 only show fixed capacitor networks 17 and 21 positioned above movable capacitor network 16.

Figure 4:
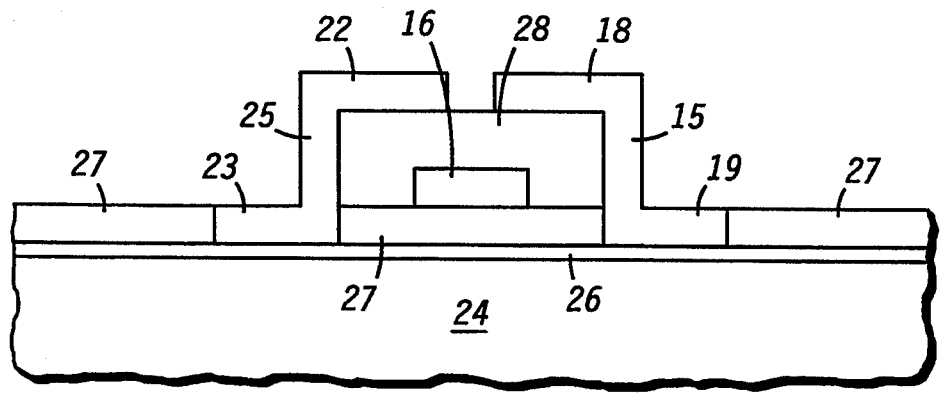
FIG. 4 is a cross-section view of a first portion of the structure shown in FIG. 3 partially through processing.

FIG. 4 illustrates a cross-section taken through bold line 4-4' in the structure shown in FIG. 3. Fixed capacitor plate 18 can be formed by blanket deposition and patterning of a homogenous doped polysilicon layer. At the same time, anchors 19 can be formed attached to the earlier exposed portion of substrate 24. Fixed capacitor plate 18 is attached to anchor 19 by a vertical support 15 formed along the sidewall of patterned sacrificial layer 28. Sacrificial layer 28 thus determines the lateral separation between movable capacitor plate 16 and vertical support 15, as well as the vertical spacing between fixed capacitor plate 18 and movable capacitor plate 16.

In a preferred embodiment, fixed capacitor 22, vertical support 25, and anchor 23 are formed during the same deposition and patterning step used to form fixed capacitor plate 18. Alignment, spacing, and geometry of fixed capacitor plate 22 are similar to that of fixed capacitor plate 18, and will not be separately described here.

Figure 5:
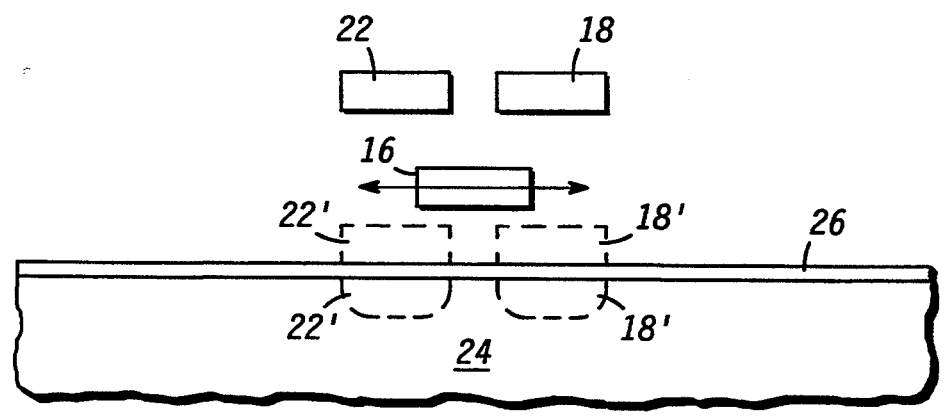
FIG. 5 is a cross-section of a second portion of the structure shown in FIG. 3 at a late stage of processing.

FIG. 5 illustrates a cross-section taken through bold line 5-5' in the structure shown in FIG. 3 after a step of sacrificial etching. As shown in FIG. 5, a sacrificial etch removes sacrificial layers 27 and 28, leaving movable capacitor plate 16 free to move in a lateral direction under fixed capacitor plate 18 and fixed capacitor plate 22 in response to acceleration, as suggested by the arrows in FIG. 5. The primary capacitance signal generated by the accelerometer in accordance with the present invention is created by a fixed capacitor plates 18 and 22 together with movable capacitor plate 16. Although there is some parasitic capacitance cause between a sidewall of movable capacitor plates 16 and vertical supports 15 and 25 (shown in FIG. 4), this parasitic capacitance is minimized by the small number of anchors 19 and 23 (as shown in FIG. 3).

An alternative method for making a laterally sensitive accelerometer in accordance with the present invention involves forming a first fixed capacitor plate on the surface of the substrate before formation of movable capacitor network 11. In this embodiment, fixed capacitor plates 18' and 22' (shown in phantom in FIG. 5), as well as fixed capacitor networks 17 and 21 (shown in FIG. 3), can be formed by a patterned polysilicon layer or by diffusion into substrate 24. Following formation of fixed capacitor plates 18' and 22' movable capacitor network 11 is formed as described hereinbefore.

An important feature of the present invention is that a differential capacitance signal is generated during acceleration, with the capacitance provided by fixed capacitor plate 18 ($C_{18}$) increasing when capacitance provided by fixed capacitor plate 22 ($C_{22}$) is decreasing, and vice-versa. Differential output improves sensitivity and improves signal to noise ratio for the structure. In a preferred embodiment, a signal processing means (not shown) for detecting a capacitance change produces an output signal that is a function of a ratio of $C_{18}$ and $C_{22}$, rather than merely a difference between $C_{18}$ and $C_{22}$. A capacitance ratio output provides compensation for any vertical motion of movable capacitor plates 16.

Another important feature is that the capacitance variation is caused by change in capacitor area, rather than the more common method of change in separation between capacitor plates. In the accelerometer in accordance with the present invention the separation between capacitor plates 16, 18, and 22 remains substantially constant during lateral acceleration. Capacitance between plates is a non-linear function of separation between the plates, but a linear function of capacitor area. Because of this relationship, the laterally sensitive accelerometer in accordance with the present invention is expected to have substantially linear output with acceleration, greatly simplifying the additional electronics needed to use the device, particularly for linear or analog applications.

By now it should be appreciated that a laterally sensitive accelerometer and method for making it are provided. The structure in accordance with the present invention provides substantially linear output in response to acceleration in the plane of the device, greatly simplifying packaging, mounting, and use of the accelerometer. The method of making the accelerometer in accordance with the present invention combines widely available semiconductor processes to provide the micromachined structure using only two machined polysilicon layers.

We claim:

1. A laterally sensitive accelerometer comprising: a substrate;
   a first anchor attached to the substrate, a tether coupled to the anchor and having a portion free to move in a lateral direction over the substrate in response to acceleration, a tie-bar coupled to the movable portion of the tether, and at least one movable capacitor plate coupled to the tie bar;
   a first fixed capacitor plate laterally overlapping the at least one movable capacitor and vertically spaced from the at least one movable capacitor plate; and
   a second anchor attached to the substrate; and a first vertical support coupling the first fixed capacitor plate to the second anchor, wherein the first vertical support is laterally spaced from the at least one movable capacitor plate to allow the at least one movable capacitor plate to move in a lateral direction under the first fixed capacitor plate.

2. The laterally sensitive accelerometer of claim 1 wherein the first fixed capacitor plate is located below the at least one movable capacitor plate.

3. The laterally sensitive accelerometer of claim 1 further comprising: a second fixed capacitor plate laterally overlapping the at least one movable capacitor plate positioned opposite of the first fixed capacitor plate and electrically isolated from the first fixed capacitor plate;
   a third anchor attached to the substrate; and a second vertical support coupling the second fixed capacitor plate to the third anchor, wherein the second vertical support is laterally spaced from the at least one movable capacitor plate to allow the at least one movable capacitor plate to move in a lateral direction under the second fixed capacitor plate.

4. The laterally sensitive accelerometer of claim 1 wherein the first anchor, the tether, the tie-bar, and the at least one movable capacitor plate comprise a homogenous patterned layer of polysilicon.

5. The laterally sensitive accelerometer of claim 1 wherein the first fixed capacitor plate, the second anchor, and the first vertical support comprise a homogenous patterned layer of polysilicon.

6. The laterally sensitive accelerometer of claim 1 further comprising at least two first anchors, wherein the tether couples to both of the at least two first anchors and the portion of the tether that is free to move in a lateral direction lies between the two first anchors.

7. The laterally sensitive accelerometer of claim 6 further comprising at least two tie-bars spaced from each other, wherein each tie bar has one end coupled to the tether, and the at least one movable capacitor plate spans between the at least two tie-bars.

8. A laterally sensitive accelerometer comprising:
   a substrate;
   a first set of anchors attached to the substrate;
   a tether spanning between two of the first set of anchors;
   a first tie-bar having one end coupled to a central portion of the tether;
   a second tie-bar having one end coupled to the central portion of the tie-bar and spaced from the first tie-bar;
   a set of rectangular movable capacitor plates, wherein each of the movable capacitor plates has one end attached to the first tie bar and another end attached to the second tie bar in a parallel arrangement;
   a second set of anchors attached to the substrate;
   a first set of vertical supports attached to the second set of anchors and extending upwards therefrom; and
   a first set of fixed capacitor plates, each of the first set of fixed capacitor plates laterally overlapping a portion of one of the movable capacitor plates and attached to at least two of the first set of vertical supports, wherein each of the first set of fixed capacitor plates is substantially parallel to the movable capacitor plates and vertically spaced from the movable capacitor plates.

9. The laterally sensitive accelerometer of claim 8 further comprising: a third set of anchors attached to the substrate;
   a second set of vertical supports attached to the third set of anchors and extending upwards therefrom; and
   a second set of fixed capacitor plates, each of the second set of fixed capacitor plates laterally overlapping a portion of one of the movable capacitor plates and attached to at least two of the second set of vertical supports, wherein each of the second set of fixed capacitor plates is substantially parallel to the movable capacitor plates and vertically spaced from the movable capacitor plates.

10. The laterally sensitive accelerometer of claim 9 wherein the movable capacitor plates, the first set of fixed capacitor plates, and the second set of fixed capacitor plates comprise doped polysilicon.

11. The laterally sensitive accelerometer of claim 9 wherein the movable capacitor plates comprise a first patterned homogenous layer of polysilicon and the first and second sets of fixed capacitor plates comprise a second pattered homogenous layer of polysilicon.

12. The laterally sensitive accelerometer of claim 8 wherein each of the movable capacitor plates are electrically coupled in parallel.

13. The laterally sensitive accelerometer of claim 8 wherein each of the first set of fixed capacitor plates are electrically coupled in parallel.

14. The laterally sensitive accelerometer of claim 9 wherein each of the second set of fixed capacitor plates are electrically coupled in parallel.

15. The laterally sensitive accelerometer of claim 8 wherein the capacitance between the each movable capacitor plate and each of the first set of fixed capacitor plates varies substantially linearly with applied acceleration.

16. A method for making a laterally sensitive accelerometer comprising the steps of: providing a substrate; covering the substrate with a first sacrificial layer; patterning the first sacrificial layer to expose portions of the substrate; depositing a first polysilicon layer; patterning the first polysilicon layer to provide a plurality of anchors, a tether coupled between two of the plurality of anchors, and a movable capacitor plate, wherein the movable capacitor plate is coupled to a central portion of the tether; covering the movable capacitor plate with a second sacrificial dielectric; patterning the second sacrificial dielectric to expose some of the anchors; forming a first fixed capacitor plate having a first portion that is attached to at least two of the exposed anchors and a second portion that overhangs the movable capacitor plate and is vertically separated from the movable capacitor plate by the thickness of the second sacrificial dielectric; and removing the first and second sacrificial layers by etching.

17. The method of claim 16 further comprising the steps of: forming a second fixed capacitor plate having a first portion that is attached to at least two of the exposed anchors on an opposite side of the movable capacitor plate from the first fixed capacitor plate, wherein the second fixed capacitor plate has a second portion that overhangs the movable capacitor plate and is vertically separated from the movable capacitor plate by the thickness of the second sacrificial dielectric.

18. A method for making a laterally sensitive accelerometer comprising the steps of: providing a substrate having a surface; forming a first fixed capacitor plate on the surface of the substrate; covering the first fixed capacitor plate with a sacrificial layer; patterning the sacrificial layer to expose portions of the substrate; depositing a first polysilicon layer; patterning the first polysilicon layer to provide a plurality of anchors, a tether coupled between two of the plurality of anchors, and a movable capacitor plate, wherein the movable capacitor plate is coupled to a central portion of the tether, has a portion of that overhangs the fixed capacitor plate and is vertically separated from the fixed capacitor plate by the thickness of the sacrificial dielectric; and removing the sacrificial layer by etching.

* * * * *